United States Patent
Leoni et al.

(10) Patent No.: US 10,000,074 B2
(45) Date of Patent: Jun. 19, 2018

(54) WRITING TO AN ELECTRONIC IMAGING SUBSTATE

(75) Inventors: Napolean J. Leoni, San Jose, CA (US); Richard Fotland, Franklin, MA (US); Omer Gila, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 562 days.

(21) Appl. No.: 14/349,919

(22) PCT Filed: Oct. 20, 2011

(86) PCT No.: PCT/US2011/057131
§ 371 (c)(1),
(2), (4) Date: Apr. 4, 2014

(87) PCT Pub. No.: WO2013/058757
PCT Pub. Date: Apr. 25, 2013

(65) Prior Publication Data
US 2014/0253426 A1 Sep. 11, 2014

(51) Int. Cl.
*B41J 3/407* (2006.01)
*G02F 1/167* (2006.01)
*G09G 3/34* (2006.01)

(52) U.S. Cl.
CPC ........... *B41J 3/4076* (2013.01); *G02F 1/167* (2013.01); *G09G 3/344* (2013.01); *G09G 2380/00* (2013.01)

(58) Field of Classification Search
CPC ... G06K 19/07707; B41J 3/4076; G09F 9/372
USPC .......................... 347/112; 399/223; 346/159
See application file for complete search history.

(56) References Cited

U.S. PATENT DOCUMENTS

| | | | |
|---|---|---|---|
| 4,558,334 A * | 12/1985 | Fotland | 347/128 |
| 4,816,653 A | 3/1989 | Anderl et al. | |
| 4,972,212 A | 11/1990 | Hauser et al. | |
| 5,225,856 A * | 7/1993 | Thieret | H04N 1/40025 347/120 |
| 5,866,284 A | 2/1999 | Vincent | |
| 6,222,513 B1 | 4/2001 | Howard et al. | |
| 6,333,754 B1 | 12/2001 | Oba et al. | |
| 6,400,492 B1 | 6/2002 | Morita | |
| 6,424,387 B2 | 7/2002 | Sato et al. | |

(Continued)

FOREIGN PATENT DOCUMENTS

| | | |
|---|---|---|
| JP | 7179060 | 7/1995 |
| JP | 11010936 | 1/1999 |

(Continued)

OTHER PUBLICATIONS

The International Search Report and The Written Opinion of the International Searching Authority; International Application No. PCT/US2011/057131; International Filing dated Oct. 20, 2011.

*Primary Examiner* — Mark Edwards
(74) *Attorney, Agent, or Firm* — Fabian VanCott (57) ABSTRACT

A method for writing to an electronic imaging substrate includes passing an electronic imaging substrate in relation to a writing device to change a state of image cells within the electronic imaging substrate. The imaging substrate is placed close enough to the writing device to reduce a blooming effect to a predefined threshold level when changing a state of one of the image cells within the electronic imaging substrate.

20 Claims, 8 Drawing Sheets

(56) References Cited

U.S. PATENT DOCUMENTS

| | | |
|---|---|---|
| 6,426,827 B1 | 7/2002 | Bonhote et al. |
| 6,456,272 B1 | 9/2002 | Howard |
| 6,515,790 B2 | 2/2003 | Miyamoto et al. |
| 6,573,880 B1 | 6/2003 | Simoni et al. |
| 6,738,050 B2 | 5/2004 | Comiskey et al. |
| 6,795,228 B2 | 9/2004 | Sacripante et al. |
| 6,982,734 B2 | 1/2006 | Pan et al. |
| 7,140,550 B2 | 11/2006 | Ramachandran |
| 7,265,894 B2 | 9/2007 | Schmitz |
| 7,284,708 B2 | 10/2007 | Martin |
| 7,463,400 B1 | 12/2008 | Tatsuura et al. |
| 7,580,845 B2 | 8/2009 | Burman et al. |
| 7,789,489 B2 | 9/2010 | Matsuzoe |
| 7,834,843 B2 | 11/2010 | Karaki |
| 7,975,927 B1 | 7/2011 | Whitney |
| 8,144,388 B2 | 3/2012 | Ogawa |
| 8,514,256 B2 | 8/2013 | Ogawa et al. |
| 2001/0020935 A1 | 9/2001 | Gelbman |
| 2002/0021911 A1* | 2/2002 | Matsuura ............... B41J 3/4076 399/45 |
| 2003/0067427 A1 | 4/2003 | Comiskey et al. |
| 2004/0263470 A1 | 12/2004 | Sprague et al. |
| 2005/0134550 A1 | 6/2005 | Schmitz |
| 2005/0247797 A1 | 11/2005 | Ramachandran |
| 2006/0017659 A1* | 1/2006 | Ogawa ................... B41J 3/4076 345/30 |
| 2006/0125778 A1 | 6/2006 | Apte |
| 2006/0170981 A1* | 8/2006 | Ricks .................... B41J 3/4076 358/3.32 |
| 2007/0045399 A1* | 3/2007 | Martin ............. G06K 19/06187 235/380 |
| 2007/0061214 A1 | 3/2007 | Schmitz |
| 2007/0176973 A1 | 8/2007 | Hisanobu |
| 2007/0188848 A1 | 8/2007 | Machida et al. |
| 2008/0186259 A1 | 8/2008 | Todorokihara et al. |
| 2008/0217412 A1 | 9/2008 | Lane |
| 2008/0292978 A1 | 11/2008 | Lin |
| 2008/0308629 A1* | 12/2008 | Roskind ................. G06F 21/34 235/382 |
| 2010/0060628 A1 | 3/2010 | Lenssen |
| 2010/0116894 A1 | 5/2010 | Modica |
| 2011/0060640 A1 | 3/2011 | Thompson et al. |
| 2011/0081527 A1* | 4/2011 | Yamato .................. H05K 3/386 428/195.1 |
| 2011/0101111 A1 | 5/2011 | Roncari et al. |
| 2011/0298760 A1* | 12/2011 | Gila ...................... B41J 3/4076 345/179 |
| 2012/0001889 A1 | 1/2012 | Kimura |
| 2012/0206341 A1 | 8/2012 | Gila et al. |
| 2012/0274620 A1 | 11/2012 | Hwang et al. |
| 2012/0320001 A1 | 12/2012 | Gila et al. |
| 2013/0003162 A1 | 1/2013 | Leoni et al. |
| 2013/0235446 A1 | 9/2013 | Leoni et al. |
| 2014/0210805 A1 | 7/2014 | Birecki et al. |
| 2014/0239068 A1 | 8/2014 | Park |
| 2014/0253426 A1 | 9/2014 | Leoni et al. |

FOREIGN PATENT DOCUMENTS

| | | |
|---|---|---|
| JP | 2002-350905 | 12/2002 |
| JP | 2006-035478 | 2/2006 |
| JP | 2008-149498 | 7/2008 |
| JP | 2010046848 | 3/2010 |
| JP | 2010069732 | 4/2010 |
| KR | 10-2008-0109408 | 12/2008 |
| KR | 20080064405 | 7/2009 |

* cited by examiner

Pass an electronic imaging substrate by a writing device to change a state of an image cell within the electronic imaging substrate
(block 802)

Stop a movement of the electronic imaging substrate in relation to the writing device to change the state of the image cell, the electronic imaging substrate being placed close enough to the writing device when being stopped so as to reduce a blooming effect to a predefined threshold level
(block 804)

Move the electronic imaging substrate in relation to the writing device so that a state of a subsequent image cell is in position to be changed by the writing device
(block 806)

*Fig. 8*

WRITING TO AN ELECTRONIC IMAGING SUBSTATE

BACKGROUND

Electronic paper is a type of electronic display designed to reflect ambient light back to the viewer. This is opposed to traditional display technologies that emit rather than reflect light. Electronic paper is thus designed to mimic the appearance of ink on physical paper. One type of electronic paper display is an electrophoretic display. One type of electrophoretic display includes a two dimensional array of microcapsules. Each microcapsule includes a number of particles suspended in a liquid. In one example, the particles include both white particles and black particles. These two different colors of particles are oppositely charged. By manipulating an electric field across each microcapsule, that microcapsule can be switched to appear white or black.

One way to manipulate the electric field is to form an array of switching circuitry underneath the array of microcapsules. This switching circuitry addresses each microcapsule individually to switch the state of that microcapsule to either display a white or black color to a human viewer. The costs of manufacturing such electronic paper displays are due primarily to the cost of the switching circuitry used to change the state of the display.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, one way to manipulate the electric field in order to cause an image to be displayed on the electronic paper is to form an array of switching circuitry underneath the array of microcapsules. This switching circuitry addresses each microcapsule individually to switch the state of that microcapsule to either display a white or black color to a human viewer. The costs of manufacturing such electronic paper displays are due primarily to the cost of the switching circuitry used to change the state of the display.

One way to avoid such costs is to use an electronic imaging substrate as the electronic paper display. The electronic imaging substrate includes the microcapsule array without the circuitry underneath. An external writing device is then used to change the state of the electronic imaging substrate so that it displays the desired image. This external writing device may be, for example, an ion head. The ion head projects a beam of charged particles. When these charged particles reach the surface of a microcapsule, the oppositely charged particles within the microcapsule will be pulled toward the surface, thus changing the state of that microcapsule.

One use of such an electronic imaging substrate may be for small handheld sized cards. For example, an access card may include a region that is made of an electronic imaging substrate. As the access card holder accesses a particular facility, the time and date stamp may be written onto the electronic imaging substrate region using an external writing device. Various other security features may be printed onto that region as well. In a further example, a gift card may display the amount of money left on that card. When that gift card is used, the external writing device may rewrite the electronic imaging region of that card so that the new balance is displayed.

One issue with using an external writing device to change the state of an electronic imaging substrate is an effect referred to as blooming. During the writing process, the electronic imaging substrate is moved in relation to the writing device. The writing device is modulated to produce the appropriate particle beam at certain regions on the electronic imaging substrate to form the desired image. In order to allow the electronic imaging substrate to pass by the writing device smoothly, a gap between the substrate and the writing device is maintained. This gap allows for the blooming effect to occur because the electric field created within the gap between the writing device and the imaging substrate is such that it pushes the particles that are projected from the writing device outward rather than straight. This blooming effect results in a larger set of microcapsules than desired being altered during the writing process. A particular dot or line may be larger than intended. The blooming effect thus reduces the precision with which an external writing device may rewrite the images on the electronic imaging substrate.

In light of this and other issues, the present specification discloses methods and systems for rewriting the state of an electronic imaging substrate with an external device while minimizing blooming effects. According to certain illustrative examples, the writing device makes contact with or comes very close to the surface of the electronic imaging substrate during the writing process. By eliminating the gap between the writing head and the electronic imaging substrate, the blooming effect is sufficiently reduced.

In one example, as the electronic imaging substrate passes in relation to the writing device while the writing device maintains a specified distance from the imaging substrate. When the writing device comes to a region of the electronic imaging substrate where the state of the image is to be changed, then the movement between the writing device and substrate is stopped. The writing device is then lowered to make contact with the electro imaging device to change the state of the image cells at that region. When the writing process at that region is complete, the writing device is then moved away from the imaging substrate so that the movement of the electronic imaging substrate in relation to the writing head can continue.

Although moving the writing device into contact with the electronic imaging substrate for writing and then moving it away slows down the overall process, the resolution at which the external writing device is able to print is greatly increased as a result of the reduced blooming effect. Furthermore, the increase in the amount of time it takes to rewrite the electronic imaging substrate is not problematic. For example, the overall writing process may take only a few seconds rather than a few microseconds.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1A:
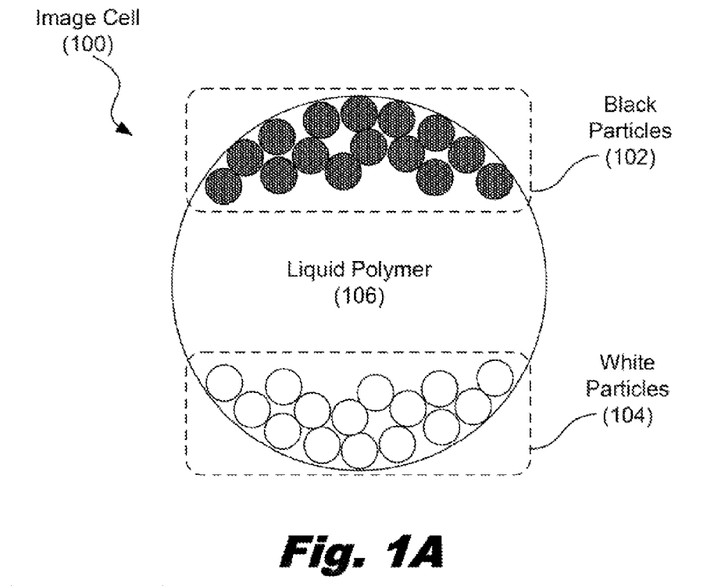
FIG. 1A is a diagram showing an illustrative image cell, according to one example of principles described herein.

Referring now to the figures, FIG. 1A is a diagram showing an illustrative image cell (100). Although a variety of electronic paper technologies may be used with the methods and systems embodying principles described herein, the following example illustrates these principles as they apply to an electrophoretic display technology. In such a display technology, each image cell corresponds to a microcapsule.

The image cell (100) includes a number of black particles (102) and a number of white particles (104). The particles (102) are suspended within a liquid polymer (106) within the image cell (100). In one example, the black particles (102) are negatively charged while the white particles (104) are positively charged. Thus, an electric field applied across the image cell will move all of the negatively charged white particles (104) and all of the positively charged black particles to the other end. The polarity of the electric field can be reversed so that the image cell can take on either a white appearance or a black appearance. When such image cells are used to form a two dimensional array, images can be formed within that array by selectively applying an electric field across certain image cells in order to form the desired image.

Figure 1B:
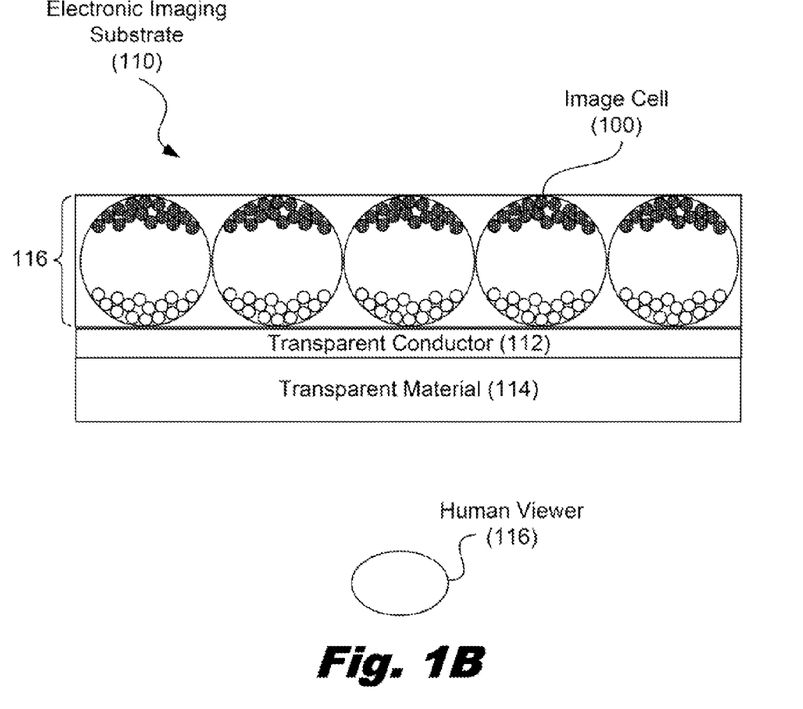
FIG. 1B is a diagram showing an illustrative cross-sectional view of a portion of an electronic imaging substrate, according to one example of principles described herein.

FIG. 1B is a diagram showing an illustrative cross-sectional view of a portion of an electronic imaging substrate (110). According to certain illustrative examples, the electronic imaging substrate includes an image cell layer (116). The image cell layer includes an array of image cells (100). A transparent conductor (112) is placed on one side of the image cell layer (116). This transparent conductor can then be grounded. As will be described in further detail below, the transparent conductor is used to hold charges in order to produce the desired electric fields used to change the state of the image cells.

A transparent material (114) such as transparent mylar is then placed adjacent to the transparent conductor. This transparent material serves as the surface of the electronic imaging substrate that is viewed by a human viewer (116). The transparent material (114) also acts as insulation between the transparent conductor (112) and any other contacts such as human fingers which may affect the charges within the transparent conductor.

The type of electrophoretic display technology described herein is merely one form of electrophoretic display. Other types of electrophoretic displays may also be used in systems embodying principles described herein. For example, some electrophoretic displays include microcapsules with a dark polymer liquid with white particles suspended therein. The white particles are forced towards the viewer when that capsule is intended to display a white color. Conversely, the white particles are forced away from the viewer when the microcapsule is intended to display a dark color.

Figure 2:
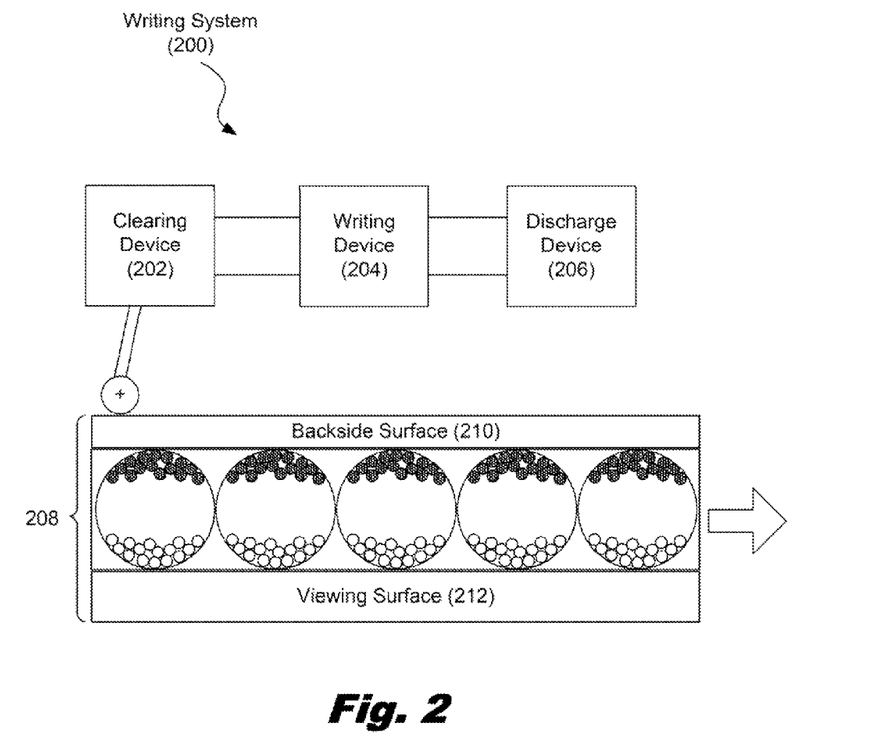
FIG. 2 is a diagram showing an illustrative external electronic imaging substrate writing system, according to one example of principles described herein.

FIG. 2 is a diagram showing an illustrative external electronic imaging substrate writing system (200). According to certain illustrative examples, the electronic imaging substrate (208) moves in relation to the writing system (200). The writing system (200) includes a clearing device (202), a writing device (204), and a discharge device (206).

As the electronic imaging substrate (208) moves in relation to the writing system (200), it will first pass by a clearing device (202). The clearing device (202) is used to erase any images that are currently being displayed on the electronic imaging substrate (208). In one example, the clearing device (206) is configured to set each image cell so that it displays a white color to a human viewer. In one example, the clearing device (202) is an electrode that comes into close contact or is dragged along the surface of the electronic imaging substrate. The electrode may be positively charged and thus the negatively charged black particles within the image cells will be drawn towards the electrode while the positively charged white particles within the image cells will be repelled towards the viewer. Thus, the clearing device (202) causes the surface of the electronic imaging substrate (208) to display a white color.

After the clearing unit (202) has erased any images already on the electronic imaging substrate (208), the substrate (208) will pass beneath the writing device (204). In one example, the writing device (204) is an ion head configured to project charged particles onto the backside surface of the electronic imaging substrate (208). The backside surface refers to the side opposing the side seen by a human viewer. The side seen by a human viewer will be referred to as the viewing surface (212).

In some examples, the backside surface (210) includes a protective layer to prevent stray electric charges from adversely affecting the image printed onto the electronic imaging substrate (208). For example, the oils resulting from human contact may include charges that may distort the image printed onto the substrate (208). The protective layer can be designed so that the charged particles from the writing device (204) are able to get through in order to change the state of the image cells while preventing stray charges from affecting those image cells. In some cases, the protective layer may include a porous dielectric material. This porous dielectric material may be designed so that only the writing device may be able to project charges through the backside surface (210) in a manner that will effectively rewrite the image on the electronic imaging substrate (208).

Thus, it will be extremely difficult for someone to rewrite the electronic imaging substrate on their own as they will likely not have access to the proper writing equipment.

In one example, a writing device (204) such as an ion head projects negatively charged ions onto the backside surface of the electronic imaging substrate (208). This will attract the positively charged white particles towards the backside surface and repel the negatively charged black particles towards the viewing surface. The writing device is configured to selectively project the negatively charged ions at certain regions in order to form the desired image as the electronic imaging substrate (208) passes.

In some, examples, the writing system (200) includes a discharge device (206). The discharge device (206) is configured to remove any excess ions from the backside surface of the electronic imaging substrate. For example, the discharge device may be a rubber conductor to collect both positively and negatively charged particles from the backside surface. If these excess charged particles were to remain on the backside surface, it is possible that they may be redistributed by regular human handling of the electronic imaging substrate. This redistribution of charged particles may cause distortion of the printed image. Thus, by removing these excess charged particles, image distortion becomes less likely.

Typically, in order to print an image onto the electronic imaging substrate using such a writing system (200), the electronic imaging substrate remains a specified distance from the writing device (204) in order to provide for a smoother and quicker writing process. However, as mentioned above, this distance leads to an undesired blooming effect.

Figure 3A:
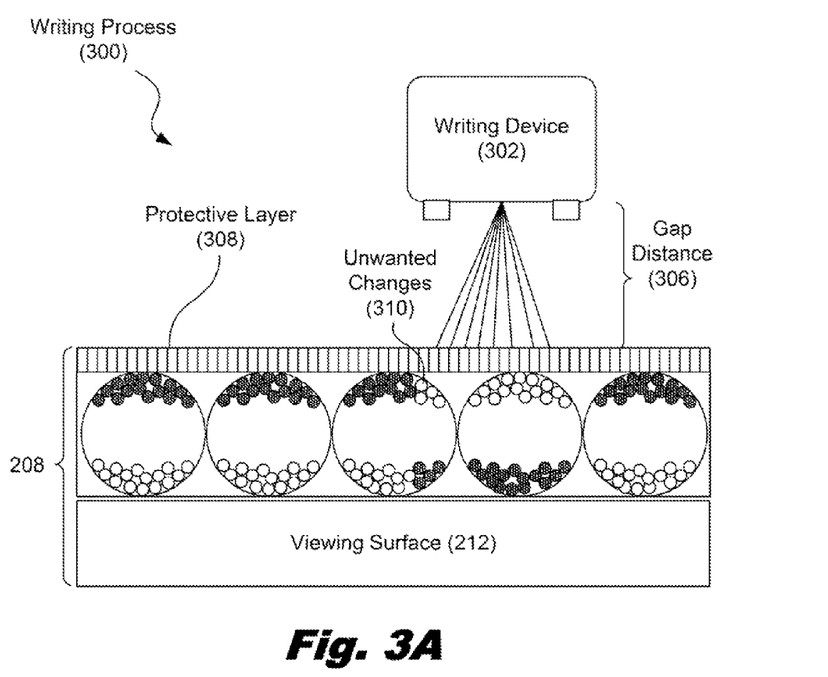
FIG. 3A is a diagram showing an illustrative writing process with a relatively wide gap between the writing device and the electronic imaging substrate, according to one example of principles described herein.

FIG. 3A is a diagram showing an illustrative writing process (300) with a relatively wide gap between the writing device (302) and the electronic imaging substrate (208). According to certain illustrative examples, the gap distance (306) between the writing device (302) and the backside surface of the electronic imaging substrate (208) leads to the blooming effect. As the charged particles are projected onto the backside surface of the electronic imaging substrate, a buildup of those charged particles forms on the backside surface.

As subsequently projected charged particles are projected onto the electronic imaging substrate where the buildup of charged particles has formed, the particles are forced outward by electrostatic forces. Those outwardly forced panicles end up over adjacent image cells which may cause the particles within those image cells to change positions. As these image cells are not intended to be changed, then the image is slightly distorted. A dot or line printed by the writing system may be bigger in size than desired. This decreases the resolution at which the writing device is able to print onto the electronic imaging substrate.

Figure 3B:
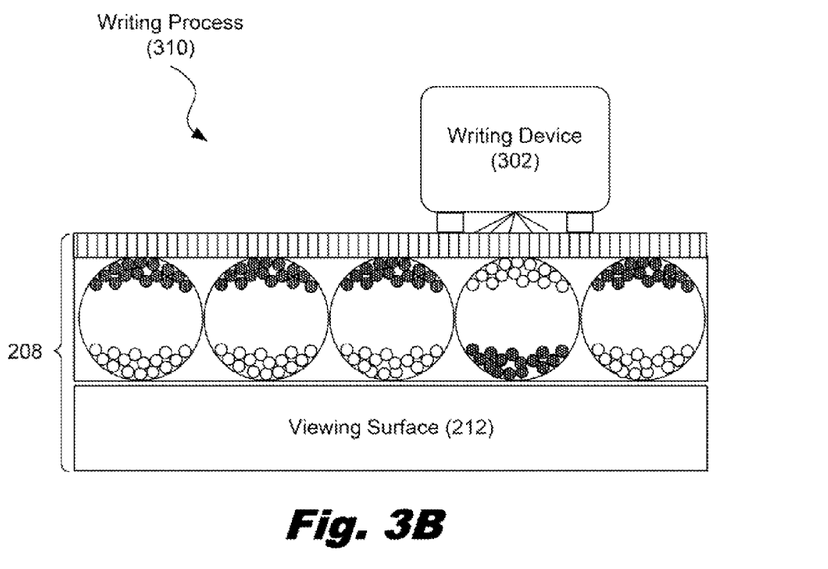
FIG. 3B is a diagram showing an illustrative writing process with a relatively small gap between the writing device and the electronic imaging substrate, according to one example of principles described herein.

FIG. 3B is a diagram showing an illustrative writing process with a relatively small gap between the writing device and the electronic imaging substrate. According to certain illustrative examples, the blooming effect can be reduced by moving the writing device (302) closer to the electronic imaging substrate (208). This is because a closer gap can allow for a stronger electric field between the writing device (302) and the substrate (208). The reasons for this will be discussed in greater detail below with the text accompanying FIG. 6. This stronger electric field allows for a more focused projection of charged particles towards the electronic imaging substrate (208). This focused projection makes it more likely that only image cells intended to be rewritten are affected by the writing device (302). This, in turn, provides for a finer resolution to be printed onto the electronic imaging substrate (208).

In some cases, the writing device (302) may make contact with the electronic imaging substrate (208). Although this slows down or limits the ability of the electronic imaging substrate (208) to move smoothly in relation to the writing device (302), the printing resolution can be greatly enhanced. This is because by bringing the writing device within closer proximity to the electronic imaging substrate (208), the blooming effect is reduced. In some examples, the protective layer (308), such as a porous dielectric layer, may act as a spacer between the writing device (302) and the electronic imaging substrate (208). The thickness of the spacer may be designed so that when the writing device (302) makes contact with the substrate (208), the distance between the substrate (208) and the writing device is the desired distance in order to reduce the blooming effect past a predefined threshold.

Figure 4A:
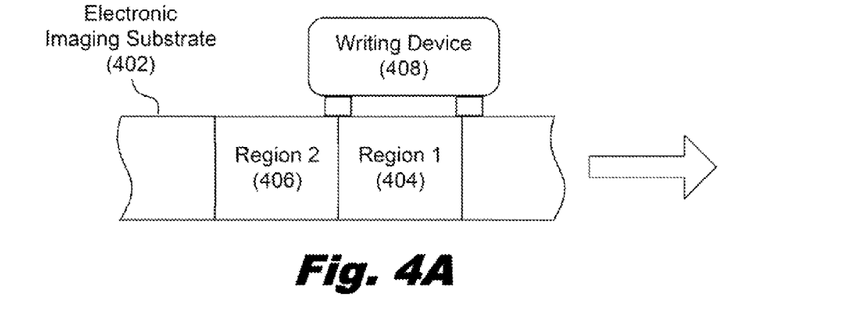
FIGS. 4A-4B are diagrams showing the illustrative operation of writing to an electronic imaging substrate by sliding a writing device along the surface of the substrate, according to one example of principles described herein.
Figure 4B:
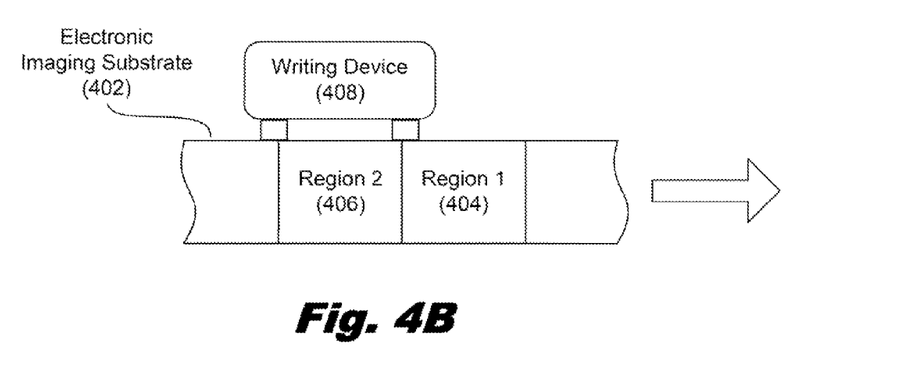

FIGS. 4A-4B ere diagrams showing the illustrative operation of writing to an electronic imaging substrate by sliding a writing device along the surface of the substrate. According to certain illustrative examples, during the writing process, the writing device (408) may make direct contact with the electronic imaging substrate (402). In some cases, if there is a porous dielectric material on the surface of the electronic imaging substrate (402), then the writing device (408) may make direct contact with the porous dielectric material.

During the writing process, the electronic imaging substrate (402) moves in relation to the writing device (408). A mechanical system, that includes a motor, may be used to move the writing device in relation to the electronic imaging substrate. Thus, the writing device (402), or spacers connected to the writing device (408), will slide along the surface of the electronic imaging substrate (402). The material of these spacers and electronic imaging substrate (402) may be such that frictional forces are minimized.

As the writing device (408) moves in relation to the substrate (402), the writing device will pass over certain regions (404, 406). While over a particular region, the writing device will engage if the state of an image cell or cells within that region is to be changed. FIG. 4A illustrates the writing device (408) passing over a first region (404) while FIG. 4B illustrates the writing device (408) passing over a second region (406). This process continues for all regions within the electronic imaging substrate that are to be changed. While passing between the first region (404) and the second region (406), the writing device (408) is essentially dragged across the surface of the electronic imaging substrate (402).

Figure 5A:
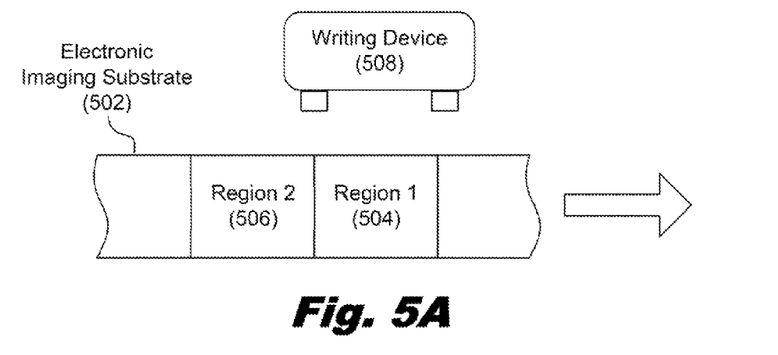
FIGS. 5A-5C are diagrams showing the illustrative operation of writing to an electronic imaging substrate with the writing head in close contact with the substrate, according to one example of principles described herein.
Figure 5B:
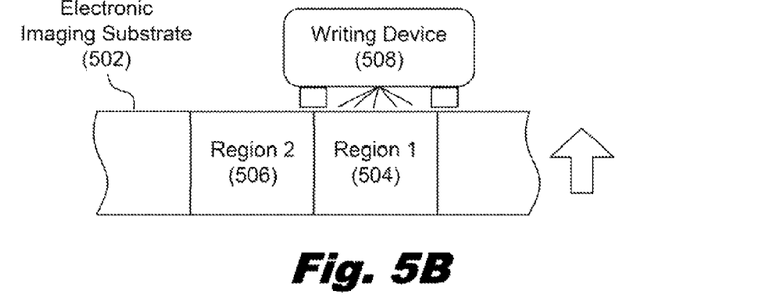
Figure 5C:
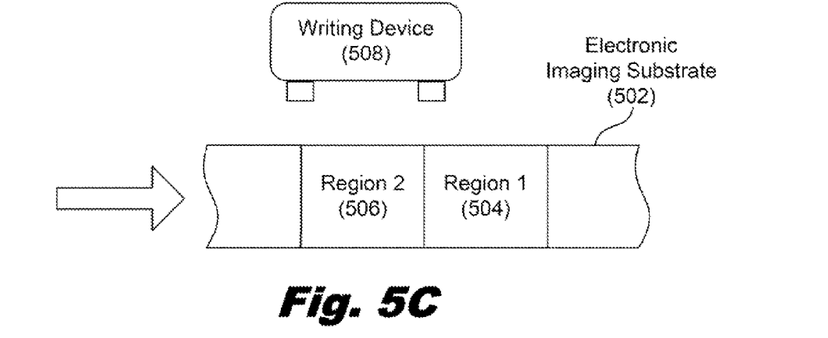

FIGS. 5A-5C are diagrams showing the illustrative operation of writing to an electronic imaging substrate (502) with the writing device (508) coming into close contact with the substrate (502). FIG. 5A is a diagram showing the electronic imaging substrate (502) as it moves in relation to the writing device (508) until the writing device (508) is directly above a particular region (504) that is to be written to by the writing device (508). As the substrate (502) moves in relation to the writing device (508), the gap between the two is such that the substrate (502) can move with ease. For example, the substrate may move while maintaining a distance of approximately 250 micrometers (μm) from the writing device (508). When the region to which the writing device will change the state of one or more image cells comes beneath the writing device, the movement will stop. The substrate (502) may then be moved closer to the writing device for the writing operation.

FIG. 5B illustrates the writing device in close proximity to the electronic imaging substrate (502). The mechanisms which move the substrate (502) in relation to the writing device (508) may be configured to move the substrate close enough to the writing device so that the blooming effect is reduced to a predefined threshold level. For example, the design specification may call for a particular resolution. In order to achieve this resolution, the blooming effect will have to be reduced below a certain level. This certain level can be determined based on various characteristics of the writing device (508), the electronic imaging substrate (502), and any protective layer which may be placed between the substrate (502) and the writing device (508). In some cases, the writing device (508) may make contact with the substrate (502).

After the electronic imaging substrate (502) has been moved close enough to the writing device (508), the writing device (508) can perform its function in order to change the state of the one or more image cells within the region (504). As described above, the writing device (508) may project charged ions onto the substrate (502) so that the particles within the image cells are oriented appropriately to form the desired image. Upon completing the writing process at the particular region (504), the substrate may be moved back away from the writing device (508). After moving away, the substrate (502) may continue its movement in relation to the writing device (508) so that the writing device (508) will be placed above a subsequent region (506) to which to print.

FIG. 5C is a diagram illustrative of the electronic imaging substrate (502) after it has moved to a subsequent region (506) that is to be written to by the writing device (508). The process thus continues for each region within the imaging substrate that is to be written to by the writing device (508). As mentioned above, the process of reducing the gap between the substrate (502) and the writing device (508) for each region will take more time. However, this extra time is not so much that it has an adverse affect effect for most applications. For example, if the electronic imaging substrate is a strip on a handheld card to be rewritten after a purchase, the card holder most likely does not care if the process takes a few seconds as opposed to a few microseconds.

Figure 6:
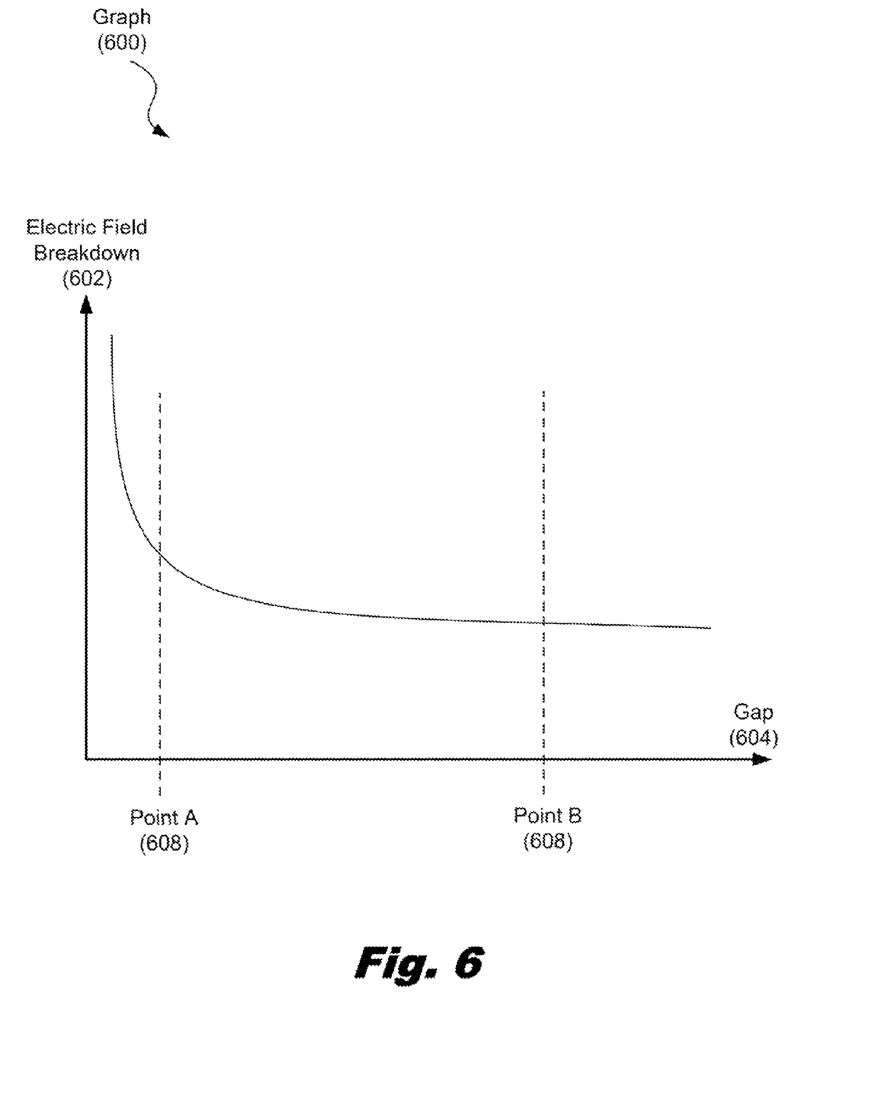
FIG. 6 is a graph showing an illustrative relationship between gap distance and electrical field breakdown, according to one example of principles described herein.

FIG. 6 is a graph (600) showing an illustrative relationship between gap distance and electrical field breakdown. The vertical axis represents the electric field breakdown (602). In one example, the electric field breakdown is measured in volts per micrometer (V/μm). The horizontal axis represents the gap distance (604) between the writing device and the surface of the electronic imaging substrate. The graph (600) shows that as the gap increases, the electric field breakdown also increases. A higher electric field breakdown means that it will take more volts per micrometer to cause an electric field breakdown.

An electric field breakdown occurs when the voltage potential across a dielectric material is high enough so that the electric field breaks down and the dielectric loses its insulating characteristics. Thus, current will flow through dielectric when the electric field breaks down. For example, if the dielectric is air and a voltage is applied between two points, there is a point when the voltage potential is such that an electric current will flow in the form of an arc through the air. The electric field breakdown in air may be affected by a variety of factors such as temperature, pressure, and humidity.

During the writing process, a voltage exists between the writing device and the electronic imaging substrate. Thus, the design of such a writing device considers the electric field breakdown characteristics in order to avoid such a breakdown. At point A (608) where there is a smaller distance between the writing device and the electronic imaging substrate, a higher level of volts per micrometer will trigger an electric field breakdown. Thus, a stronger electric field may be used for the writing process without that breakdown occurring. Conversely, at point B (608), where there is a greater distance between the electronic imaging substrate and the writing device, a lower number of volts per micrometer will trigger an electric field breakdown. Thus, a weaker electric field would have to be used in order to limit the possibility of an electric field breakdown.

Figure 7:
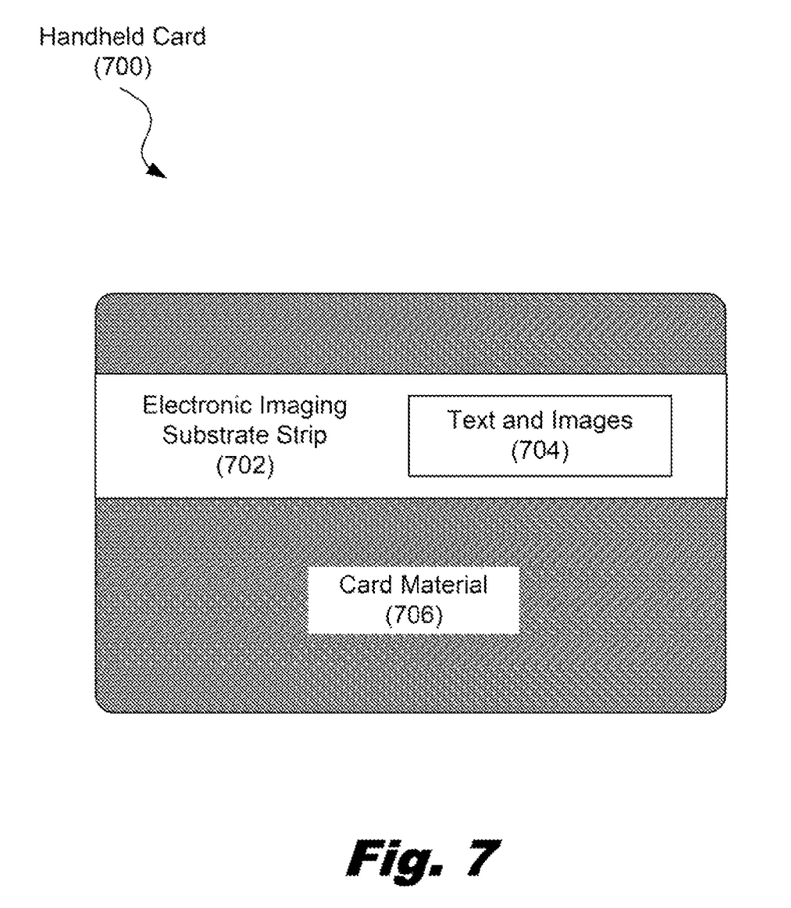
FIG. 7 is a diagram showing an illustrative handheld card having an electronic imaging substrate formed within, according to one example of principles described herein.

FIG. 7 is a diagram showing an illustrative handheld card (700) having an electronic imaging substrate formed within. According to certain illustrative examples, an electronic imaging substrate strip (702) may be embedded within a handheld sized card. In one example, the handheld sized card (700) may be approximately the size of a credit card. The card (700) may be made of a plastic card material (706) except for the region that includes the electronic imaging substrate strip (702).

Such a handheld card maybe used for a variety of applications. In one example, the card may be used as a security access card. When entering a facility, a writing device may write text or images (704) onto the electronic imaging substrate strip. The text may indicate the time and date of entry while the images may include various logos that change by the day and that security personnel will recognize.

In a further example, such a handheld card may be used as a gift card. The card may have an initial balance printed onto the electronic imaging substrate strip (702). When a customer uses the gift card, the new balance may be rewritten by a writing device used by the retailer. Additionally, various logos or advertisements may be rewritten onto the electronic imaging substrate strips of the cards as customers use the card (700).

Figure 8:
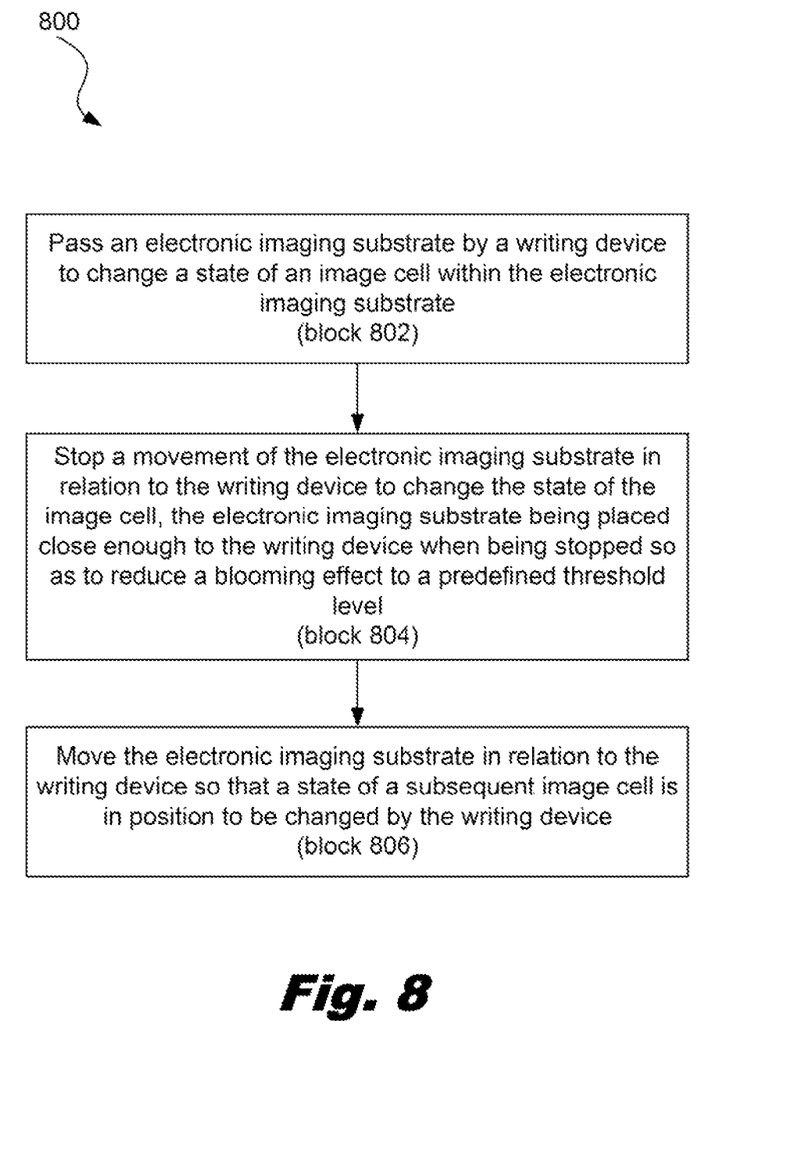
FIG. 8 is a flowchart showing an illustrative method for writing to an electronic imaging substrate, according to one example of principles described herein.

FIG. 8 is a flowchart showing an illustrative method for writing to an electronic imaging substrate. According to certain illustrative examples, the method includes passing (block 802) an electronic imaging substrate by a writing device to change a state of an image cell within the electronic imaging substrate and stopping (block 804) a movement of the electronic imaging substrate in relation to the writing device to change the state of the image cell. The electronic imaging substrate is placed close enough to the writing device when being stopped so as to reduce a blooming effect to a predefined threshold level. The method further includes moving (block 806) the electronic imaging substrate in relation to the writing device so that a state of a subsequent image cell is in position to be changed by the writing device.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An electronic imaging substrate writing system comprising:
   a writing device to change a state of an image cell within an electronic imaging substrate passing in relation to said writing device, said writing device comprising an ion beam generator to direct ions at the electronic imaging substrate to produce an electric field changing a state of an image cell within the electronic imaging substrate; and a mechanical system to move said writing device in relation to said electronic imaging substrate, wherein, when a state of a particular image cell of the electronic imaging substrate is to be changed, said mechanical system decreases a distance between said ion beam generator and said electronic imaging substrate such that, despite divergence of the ion beam, the ion beam changes the state of the particular image cell and not that of adjacent image cells so as to reduce a blooming effect below a predefined threshold level.

2. The system of claim 1, wherein said writing device is further to stop a movement of said electronic imaging substrate passing in relation to said writing device at instances when said writing device changes a state of said image cell.

3. The system of claim 2, wherein said writing device makes contact with a surface of said electronic imaging substrate when changing a state of one of said image cells.

4. The system of claim 1, wherein each image cell of said electronic imaging substrate comprises a number of dark, charged particles and a number of light, oppositely-charged particles suspended in a liquid, a state of the image cell being determined by which type of particles are visible in the image cell.

5. The system of claim 1, wherein said electronic imaging substrate comprises a porous dielectric on a side of said electronic imaging substrate placed towards said writing device, said porous dielectric acting as a spacer between said writing device and said electronic imaging substrate.

6. The system of claim 1, wherein said electronic imaging substrate is embedded within a handheld sized card.

7. The system of claim 6, wherein said electronic imaging substrate forms a strip within said card.

8. A method for writing to an electronic imaging substrate, the method comprising:

passing an electronic imaging substrate in relation to a writing device to change a state of image cells within said electronic imaging substrate, said writing device comprising an ion beam generator to direct ions at the electronic imaging substrate to produce an electric field changing a state of an image cell within the electronic imaging substrate by attracting or repelling charged particles suspended in a liquid; and when a state of a particular image cell of the electronic imaging substrate is to be changed, moving said electronic imaging substrate close enough to said writing device, within divergence of the ion beam, to reduce a blooming effect past a predefined threshold level such that, despite spreading of the ion beam, the ion beam changes the state of the particular image cell and not that of an adjacent image cell.

9. The method of claim 8, further comprising, stopping a movement of said electronic imaging substrate in relation to said writing device at instances when said writing device changes a state of one of said image cells.

10. The method of claim 9, wherein said writing device makes contact with a surface of said electronic imaging substrate when changing a state of one of said image cells.

11. The method of claim 8, further comprising sliding wherein said writing device over a surface of said electronic imaging substrate to change a state of different image cells.

12. The method of claim 8, wherein said electronic imaging substrate comprises a porous dielectric on a side of said electronic imaging substrate placed towards said writing device, said porous dielectric acting as a spacer between said writing device and said electronic imaging substrate.

13. The method of claim 8, wherein said electronic imaging substrate is embedded within a handheld sized card.

14. The method of claim 13, wherein said electronic imaging substrate forms a strip within said card.

15. A method for printing on an electronic imaging substrate, the method comprising:

passing an electronic imaging substrate by a writing device to change a state of an image cell within said electronic imaging substrate, said writing device comprising an ion beam generator to direct ions at the electronic imaging substrate to produce an electric field changing a state of an image cell within the electronic imaging substrate by attracting or repelling charged particles suspended in a liquid;

stopping a movement of said electronic imaging substrate in relation to said writing device when said writing device is aligned with a particular image cell for which a state is to be changed; and moving said electronic imaging substrate closer to said writing device such that, within divergence of the ion beam, the ion beam will change the state of the particular image cell and not an adjacent image cell so as to reduce a blooming effect to a predefined threshold level;

moving said electronic imaging substrate back away from the writing device; and repositioning the electronic imaging substrate with respect to the writing device such that a subsequent image cell is aligned with the writing head for a state change and repeating moving the electronic image substrate closer to and back away from the writing device as a state of the subsequent image cell is change.

16. The system of claim 1, wherein the electronic imaging substrate comprises field of image cells for displaying an image as written by the writing device.

17. The system of claim 16, further comprising a clearing device for clearing an image of the electronic imaging substrate prior to the writing device forming a new image by changing states of image cells of the electronic imaging substrate.

18. The system of claim 16, further comprising a discharge device for removing a charge from a surface of the electronic imaging substrate after formation of the new image by the writing device.

19. The system of claim 6, wherein the handheld sized card is a security access card and the electronic imaging substrate displays a rewritable security logo, wherein a correct security logo for display changes periodically.

20. The system of claim 6, wherein the handheld sized card is a gift card having a monetary value and the electronic imaging substrate displays a current monetary value of the gift card.

* * * * *

UNITED STATES PATENT AND TRADEMARK OFFICE
CERTIFICATE OF CORRECTION

PATENT NO. : 10,000,074 B2
APPLICATION NO. : 14/349919
DATED : June 19, 2018
INVENTOR(S) : Napolean J. Leoni et al.

It is certified that error appears in the above-identified patent and that said Letters Patent is hereby corrected as shown below:

On the Title Page

In item (54), and in the Specification, in Column 1, Line 2, Title, delete "SUBSTATE," and insert -- SUBSTRATE --, therefor.

On the page 2, in item (56), in Column 2, FOREIGN PATENT DOCUMENTS, Line 2, delete "7/2009," and insert -- 3/2008 --, therefor.

In the Claims

In Column 9, Claim 11, Line 60, before "said writing" delete "wherein".

Signed and Sealed this
Fifth Day of February, 2019

Andrei Iancu
*Director of the United States Patent and Trademark Office*